J. T. McARDLE.
MOUSE TRAP.
APPLICATION FILED MAY 13, 1914.
1,149,774.
Patented Aug. 10, 1915.
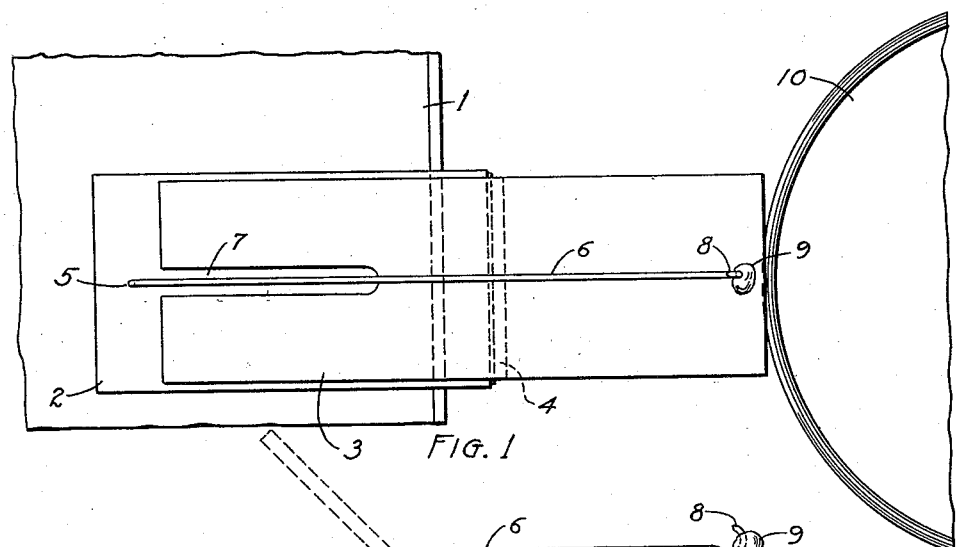
FIG. 1
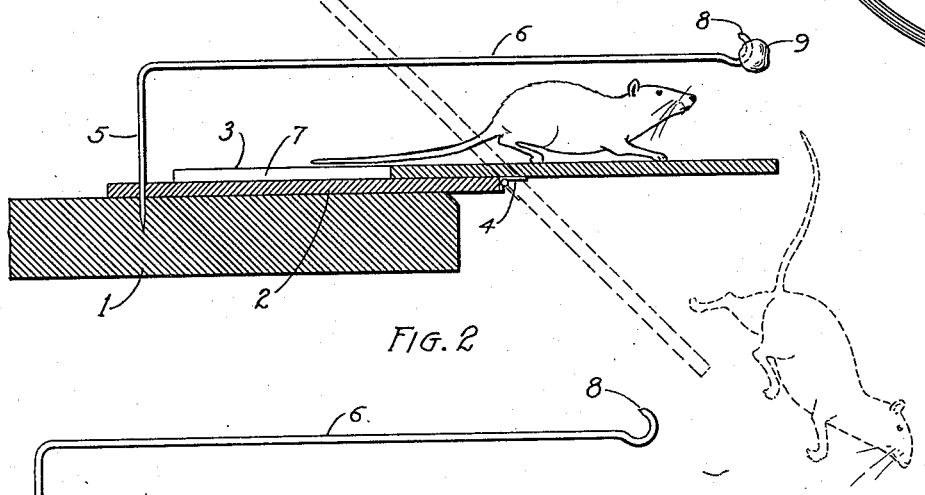
FIG. 2
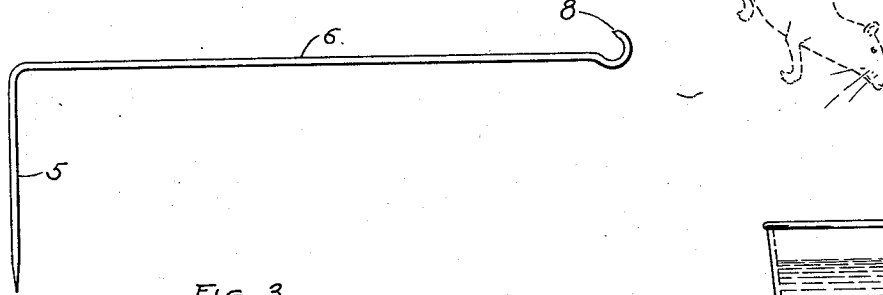
FIG. 3
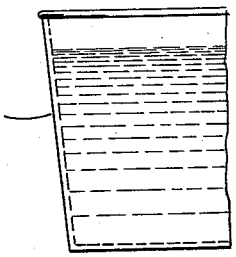
WITNESSES:
Paul F. Brown
Geo B Rawlings
INVENTOR:
John T. McArdle
BY
ATTORNEY.

UNITED STATES PATENT OFFICE.

JOHN THOMAS McARDLE, OF SANDWICH, MASSACHUSETTS, ASSIGNOR, BY DIRECT AND MESNE ASSIGNMENTS, OF ONE-FOURTH TO JOHN W. DALTON, OF SANDWICH, MASSACHUSETTS, AND ONE-FOURTH TO BENJAMIN F. GIBBY, OF BOSTON, MASSACHUSETTS.

MOUSE-TRAP.

1,149,774.  Specification of Letters Patent.  Patented Aug. 10, 1915.

Application filed May 13, 1914.  Serial No. 838,360.

*To all whom it may concern:*

Be it known that I, JOHN T. McARDLE, a citizen of the United States, residing at Sandwich, county of Barnstable, Commonwealth of Massachusetts, have invented certain new and useful Improvements in Mouse-Traps, of which the following is a specification.

This invention relates to animal traps and particularly to a self setting and ever set mouse trap. Traps of this class are well known and consist usually of a tilting platform adapted to lower under the weight of the mouse lured out to the end of the platform by the bait to drop the mouse into a cage or receptacle filled with water.

My present invention relates to this type of traps and has for its general object to simplify and cheapen the construction of such traps so that they may be produced at minimum cost.

More particularly my invention aims to provide a trap which can be mailed flat in an envelop and which can be easily and quickly attached to a shelf or other support by simply driving one end of the bait hook into the support, thus avoiding the use of extra screws or similar fastenings and enabling the trap to be set up or removed in a short time and with very little trouble. The possibility of a flat "envelop" pack is of great importance as it makes possible the sending of the trap together with literature as is so greatly desired in those States in which campaigns have been started to decrease the number of cats as a means of protecting the bird life of the community. The bait hook of my invention in addition to securing the trap to the support also acts as a stop to limit the upward tilt of the hinged platform and assists to automatically return the platform to set position.

The construction and operation of my invention will be more fully disclosed in the specification which follows.

In the drawings forming a part of that specification I have shown as an illustrative embodiment a form of trap which has proven satisfactory in practical use and capable of commercial production at a very low cost.

Throughout specification and drawings, like reference numerals are correspondingly applied and in these drawings: Figure 1 is a plan view of a trap in accordance with my invention. Fig. 2 is a longitudinal section thereof indicating in dotted lines the position which the tilting platform assumes when depressed by the weight of a mouse, and Fig. 3 is a detail view of the bait hook of my invention detached.

I have indicated at 1 a support to which my trap may be fastened. The support may be a shelf or any other convenient structure.

The trap proper consists of a base member 2 and a tilting platform 3 hinged to the base 2 by any suitable hinge 4 and normally balanced in set position. The base member 2 has a hole near its inner end to receive the vertical pin end 5 of a bait hook 6 which overlies the tilting platform and projects well beyond the hinge 4. The pin end 5 secures the trap to the support. The inner end of the tilting platform is cut out as indicated at 7 to permit this end to swing up when the opposite end is tilted downwardly by the mouse. The upward swing of the platform is limited and stopped by the horizontal shank or arm 6 of the bait hook. The rebound of the platform together with its own overweight at its inner end will return it to set position. The other end of the bait hook terminates in a barb 8 adapted to receive a suitable bait 9. The shank 6 is of a length sufficient to position the bait 9 well beyond the hinge 4 of the platform so that the mouse must walk out on the platform past the hinge to reach the bait. When the mouse passes the hinge, the equilibrium of the platform is destroyed and the platform tilts on its pivot. The outer end swings down very fast and projects the mouse into a receptacle 10 filled with water and placed beneath this end of the platform. Instead of a receptacle filled with water, a cage or other suitable receptacle may be used. The inner end of the platform tilts up until it strikes the arm 6 of the bait hook. The arm limits the upward swing and tends to return the platform automatically to set position.

In use the trap is set up on a shelf or other support by simply driving the pin end 5 of the bait hook through the hole in the base member and into the support. This projects the outer end of the tilting platform well beyond the edge of the support so that it will lower under the weight of the mouse and positions the bait 9 beyond the hinge 4 of the platform. The platform is now balanced in set position and operates as before described to tilt and return to set position.

Various modifications in the form and construction of my device may obviously be resorted to within the limits of the appended claims.

What I therefore claim and desire to secure by Letters Patent is:

1. In a trap of the class described a support, a base member thereon, a tilting member hingedly connected with said base member, and a bait hook overlying said members and terminating well beyond the hinge connection and having a pin end fixing the base member to the support.

2. In a trap of the class described, a support, a base member on said support, a tilting member hinged to said base member and having its inner end bifurcated, a bait hook having an end adapted to secure the base member to the support and having a barbed arm so positioned relative to the cut out portion of the tilting member as to permit the member to tilt freely a limited distance, said arm acting as a stop to limit the upward swing of the tilting member and to automatically return said member to set position.

3. A trap of the class described comprising a flat base member, a flat tilting member hinged between its end to one end of said base member, a bait support having a bent pointed fixing end, and a bent bait hook on said support, said bends lying all in the same plane whereby said trap may be packed flat.

4. A trap of the class described comprising a flat base member, a flat tilting member hinged between its ends to one end of said base member, and a bait support having a bent pointed fixing end, and having a bent bait hook, at its opposite end, said bends lying all in the same plane whereby said trap may be packed flat.

5. In an animal trap, a support, a member having a tilting portion and an attaching portion, and a bait carrying member having an end arranged to penetrate said attaching portion and detachably pin said portion to said support.

6. In an animal trap, a support, a member having a tilting portion and an attaching portion, and a bait carrying member having an end arranged to penetrate said attaching portion and detachably pin said portion to said support and having a bait supporting arm effectively disposed to limit the movement of the tilting portion in one direction.

7. In an animal trap, a support, a fixed base member and a balanced movable member, and a bait carrying member arranged to penetrate said base member and detachably pin it to the support and effectively disposed to limit the movement of the balanced member in one direction.

8. In an animal trap, a support, a base member, a tilting member hinged thereto, and having a slot at one end, and a bait carrying member having an end fixing said base member to the support and a barbed arm effectively disposed relative to said slot to permit a limited movement of the tilting member in one direction before stopping said member.

In testimony whereof I affix my signature in presence of two witnesses.

JOHN THOMAS McARDLE.

Witnesses:
JOHN W. DALTON,
GEORGE L. McCANN.

Copies of this patent may be obtained for five cents each, by addressing the "Commissioner of Patents, Washington, D. C."